(12) United States Patent
Jo et al.

(10) Patent No.: US 9,280,230 B2
(45) Date of Patent: Mar. 8, 2016

(54) APPARATUS AND METHOD FOR SENSING CAPACITANCE, AND TOUCH SCREEN APPARATUS

(75) Inventors: Byeong Hak Jo, Gyunggi-do (KR); Hyun Suk Lee, Gyunggi-do (KR); Moon Suk Jeong, Gyunggi-do (KR); Yong Il Kwon, Gyunggi-do (KR); Tah Joon Park, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 466 days.

(21) Appl. No.: 13/572,064

(22) Filed: Aug. 10, 2012

(65) Prior Publication Data
US 2013/0321325 A1    Dec. 5, 2013

(30) Foreign Application Priority Data

May 30, 2012   (KR) .................. 10-2012-0057389

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
CPC ......... G06F 3/044; G06F 3/045; H03F 3/005; H03F 3/45
USPC ................ 345/156–184; 324/679; 178/18.01, 178/18.03, 18.06
See application file for complete search history.

(56) References Cited

U.S. PATENT DOCUMENTS

| 2008/0129358 | A1* | 6/2008 | Monma et al. ............. 327/175 |
| 2008/0291069 | A1* | 11/2008 | Inukai et al. ............. 341/143 |
| 2009/0273392 | A1* | 11/2009 | Korobeynikov et al. ..... 327/551 |
| 2011/0242048 | A1 | 10/2011 | Guedon et al. |

FOREIGN PATENT DOCUMENTS

| JP | 2010-092152 A | * | 4/2010 | ............ 345/173 |
| JP | 2011-100186 | | 5/2011 | |
| KR | 10-2011-0080254 | | 7/2011 | |
| KR | 10-2011-0103790 | | 9/2011 | |

OTHER PUBLICATIONS

Korean Office Action mailed Aug. 28, 2013 in corresponding Korean Application No. 10-2012-0057389.

* cited by examiner

*Primary Examiner* — Aneeta Yodichkas
*Assistant Examiner* — Gerald Oliver
(74) *Attorney, Agent, or Firm* — NSIP Law

(57) ABSTRACT

There are provided an apparatus for sensing capacitance, a method for sensing capacitance, and a touch screen apparatus. The apparatus for sensing capacitance includes; a first integration circuit unit including a first capacitor charged by a change in capacitance occurring in a sensing electrode; a comparison circuit unit comparing a level of an output signal of the first integration circuit unit with a predetermined reference level; and a noise removal unit including a plurality of switches operating according to an output of the comparison circuit unit, wherein the comparison circuit unit controls an operation of each of the plurality of switches to discharge charges charged in the first capacitor when the level of the output signal of the first integration circuit unit is higher than the reference level.

16 Claims, 9 Drawing Sheets

APPARATUS AND METHOD FOR SENSING CAPACITANCE, AND TOUCH SCREEN APPARATUS

CROSS-REFERENCE TO RELATED APPLICATIONS

This application claims the priority of Korean Patent Application No. 10-2012-0057389 filed on May 30, 2012, in the Korean Intellectual Property Office, the disclosure of which is incorporated herein by reference.

BACKGROUND OF THE INVENTION

1. Field of the Invention

The present invention relates to an apparatus for sensing capacitance, a method for sensing capacitance, and a touch screen apparatus capable of minimizing an error occurring during detecting a change in capacitance due to noise.

2. Description of the Related Art

A touch sensing apparatus, such as a touch screen, a touch pad, and the like, is an input apparatus that is attached to a display apparatus to provide an intuitive input method to a user and has, in recent times, been prevalently applied to various electronic apparatuses such as mobile phones, personal digital assistants (PDAs), navigation devices, and the like. In particular, as demand for smart phones has recently increased, the use of a touch screen as a touch sensing apparatus capable of providing various input methods in a restricted form factor has been increased on a daily basis.

Touch screens applied to mobile devices may largely be classified into resistive-type touch screens and capacitive-type touch screens, according to a method of sensing a touch input utilized therein. Among the touch screens, the use of capacitive-type touch screens has been gradually increased owing to a relatively long lifespan, various input methods, easy implementation of gestures, and the like. In particular, a multi-touch interface may be more easily implemented in capacitive-type touch screens than in resistive-type touch screens, and as a result, has been widely applied to devices such as smart phones, and the like.

The capacitive-type touch screen includes a plurality of electrodes having a predetermined pattern, wherein a plurality of nodes in which a change in capacitance occurring due to a touch input is provided by the plurality of electrodes. The self-capacitance or mutual-capacitance of the plurality of nodes distributed on a two-dimensional plane may be changed by the touch input. Here, a weight average calculation method, and the like, may be applied to the change in capacitance occurring in the plurality of nodes to calculate coordinates of a touch input. In order to accurately calculate the coordinates of a touch input, a technology of accurately sensing the change in capacitance that occurs due to a touch input is required. However, when electrical noise occurs in a wireless communication module display apparatus, or the like, a change in capacitance cannot be accurately sensed.

Patent Document 1 discloses a circuit and a method for measuring capacitance of a touch sensor, in which a voltage of a capacitor charged from a change in capacitance occurring in a touch sensor is compared with a predetermined reference voltage, but does not describe removing a change in capacitance due to noise therefrom. Further, Patent Document 2 discloses a circuit for measuring capacitance but only discloses canceling an offset using a plurality of switches and it does not disclose removing a change in capacitance occurring due to noise.

RELATED ART DOCUMENT (Patent Document 1) Korean Patent Laid-Open Publication No. 10-2011-0080254
(Patent Document 2) US Patent Laid-Open Publication No. 2011/0242048

SUMMARY OF THE INVENTION

An aspect of the present invention provides a method for minimizing an effect of noise on a change in capacitance to be measured. Further, another aspect of the present invention is to remove an effect of noise by charging a charge in a first capacitor from a change in capacitance to be measured and instantaneously discharging the first capacitor when the first capacitor is affected by noise to change a voltage level to a predetermined reference level or greater.

According to an aspect of the present invention, there is provided an apparatus for sensing capacitance, the apparatus including: a first integration circuit unit including a first capacitor charged by a change in capacitance occurring in a sensing electrode; a comparison circuit unit comparing a level of an output signal of the first integration circuit unit with a predetermined reference level; and a noise removal unit including a plurality of switches operating according to an output of the comparison circuit unit, wherein the comparison circuit unit controls an operation of each of the plurality of switches to discharge charges charged in the first capacitor when the level of the output signal of the first integration circuit unit is higher than the reference level.

The apparatus may further include: a second integration circuit unit connected to the noise removal unit and including a second capacitor charged by the charges charged in the first capacitor; and an operation unit determining a touch input from an output signal of the second integration circuit unit.

The noise removal unit may include a first switch connected to a ground terminal and a second switch connected to an input node of the second integration circuit unit.

The comparison circuit unit may turn-off the second switch and turn-on the first switch when the level of the output signal of the first integration circuit unit is higher than the reference level.

The comparison circuit unit may include a first comparison circuit comparing the level of the output signal of the first integration circuit unit with a first reference level and a second comparison circuit comparing the level of the output signal of the first integration circuit unit with a second reference level.

The comparison circuit unit may operate each of the plurality of switches to discharge the charges charged in the first capacitor when the level of the output signal of the first integration circuit unit is higher than the first reference level or lower than the second reference level.

According to another aspect of the present invention, there is provided a method for sensing a change in capacitance occurring in a plurality of node capacitors defined in respective intersecting points between a plurality of first electrodes and a plurality of second electrodes, the method including: charging charges in at least one of the node capacitors; comparing a voltage level of a first capacitor supplied with the charges charged in the at least one node capacitor with a predetermined reference level; and operating a plurality of switches to discharge the charges supplied to the first capacitor when the voltage level of the first capacitor is higher than the reference level.

In the comparing of levels, a first reference level and a second reference level having a value lower than the first reference level may be respectively compared with the voltage level of the first capacitor.

In the operating of a plurality of switches, the plurality of switches may be operated to discharge the charges supplied to the first capacitor when the voltage level of the first capacitor is higher than the first reference level or lower than the second reference level.

In the operating of a plurality of switches, a first switch connected between the first capacitor and a ground terminal may be turned-on and a second switch connected between the first capacitor and an integration circuit may be turned-off, when the voltage level of the first capacitor is higher than the reference level.

The method may further include: charging a second capacitor with the charges supplied to the first capacitor; and determining a touch input causing a change in capacitance based on an voltage of the second capacitor.

According to another aspect of the present invention, there is provided touch screen apparatus including: a panel unit including a plurality of driving electrodes and a plurality of sensing electrodes; a driving circuit unit applying driving signals to the plurality of driving electrodes, respectively; a sensing circuit unit sensing a change in capacitance occurring in intersecting points between the driving electrodes having the driving signals applied thereto and the plurality of sensing electrodes; and a control unit controlling an operation of the driving circuit unit and the sensing circuit unit, wherein the sensing circuit unit includes a buffer circuit, a switching circuit, and an integration circuit unit and the buffer circuit includes a first capacitor charged by the change in capacitance, and the control unit operates the switching circuit to partially discharge charges charged in the first capacitor when a voltage level of the first capacitor is higher than a predetermined reference level.

The integration circuit unit may generate an output signal transferred to the control unit based on the charges charged in the first capacitor.

The control unit may determine a touch input applied to the panel unit from the output signal of the integration circuit unit.

The switching circuit may include a first switch connected between the first capacitor and a ground terminal and a second switch connected between the first capacitor and an input terminal of the integration circuit unit.

The control unit may turn-on the first switch and turn-off the second switch when the voltage level of the first capacitor is higher than a predetermined reference level.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
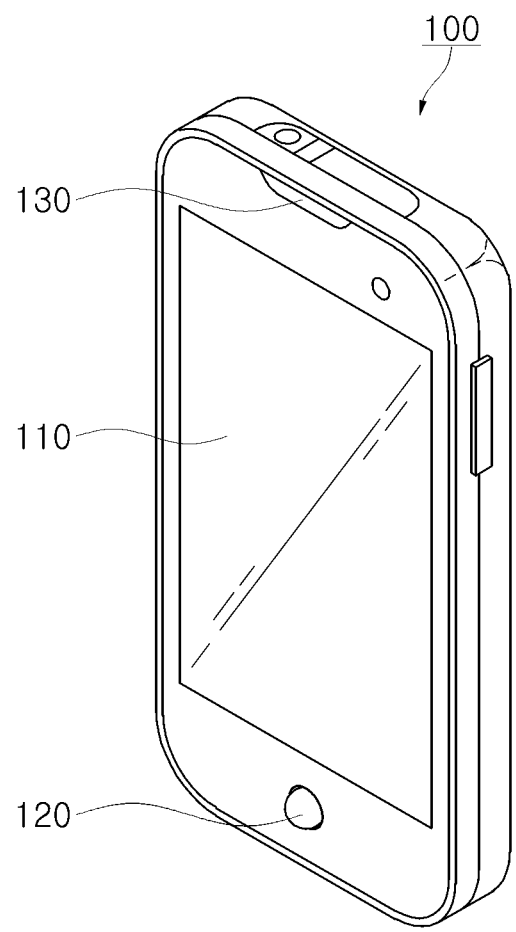
FIG. 1 is a perspective view illustrating an appearance of an electronic apparatus including a touch screen apparatus according to an embodiment of the present invention.

Embodiments of the present invention will be described in detail with reference to the accompanying drawings. These embodiments will be described in detail to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present invention will be described in detail with reference to the accompanying drawings so that those skilled in the art may easily practice the present invention.

FIG. 1 is a perspective view illustrating an appearance of an electronic apparatus including a touch screen apparatus according to an embodiment of the present invention. Referring to FIG. 1, an electronic apparatus 100 according to an embodiment of the present invention includes a display apparatus 110 for outputting a screen, an input unit 120, an audio unit 130 for outputting audio information, and the like, and may include a touch screen apparatus integrated with the display apparatus 110.

As shown in FIG. 1, in the case of mobile equipment, a touch screen apparatus is generally integrated with a display apparatus. The touch screen apparatus needs to have light transmittance sufficiently high to allow a screen on which the display apparatus is displayed to transmit an image therethrough. Therefore, the touch screen apparatus may be implemented by forming sensing electrodes with materials such as indium-tin oxide (ITO), indium zinc oxide (IZO), zinc oxide (ZnO), carbon nano tube (CNT), graphene, and the like, all of which have transparency and electric conductivity, on a base substrate made of transparent film materials such as polyethylene terephthalate (PET), polycarbonate (PC), polyethersulfone (PES), polyimide (PI), and the like. Wiring patterns connected to sensing electrodes made of transparent conductive materials are disposed in a bezel area of the display apparatus. Wiring patterns are visually shielded and therefore, can also be formed of metal materials such as silver (Ag), copper (Cu), and the like.

Meanwhile, it is assumed that the touch screen apparatus according to the embodiment of the present invention operates according to a capacitive scheme. Thus, the touch screen apparatus may include a plurality of electrodes having a predetermined pattern. In addition, the touch screen apparatus includes an apparatus for sensing capacitance in order to detect a change in capacitance occurring in the plurality of electrodes. Hereinafter, the apparatus for sensing capacitance and the operating method thereof according to the embodiment of the present invention will be described with reference to FIGS. 2 and 3.

Figure 2:
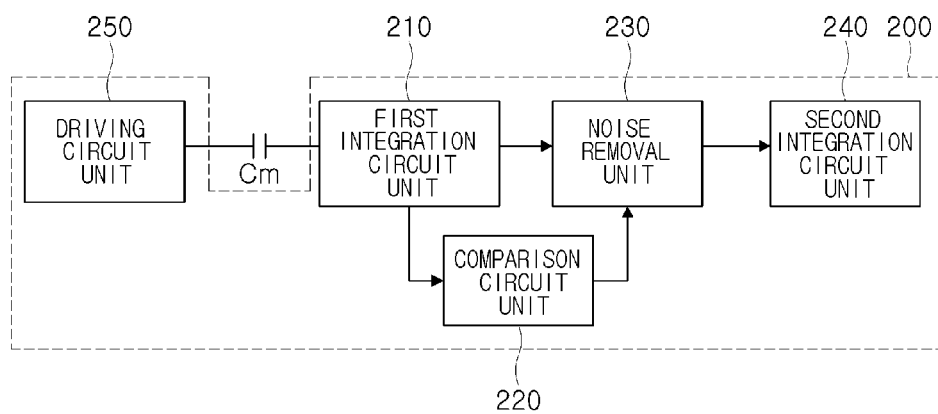
FIG. 2 is a block diagram illustrating an apparatus for sensing capacitance according to an embodiment of the present invention.

FIG. 2 is a block diagram illustrating an apparatus for sensing capacitance according to an embodiment of the present invention. Referring to FIG. 2, an apparatus 200 for sensing capacitance according to the embodiment of the present invention may include a first integration circuit unit 210, a comparison circuit unit 220, and a noise removal unit 230. In addition, in addition to the above components, the apparatus 200 for sensing capacitance may further include a second integration circuit unit 240 and a driving circuit unit 250.

In FIG. 2, a capacitor Cm corresponds to a capacitor in which the capacitance to be measured by the apparatus 200 for sensing capacitance according to the embodiment of the present invention is charged. For example, the capacitor Cm may correspond to mutual-capacitance occurring among the plurality of electrodes that are included in the capacitive touch screen. Hereinafter, for convenience of explanation, it is assumed that the apparatus 200 for sensing capacitance according to the embodiment of the present invention senses the change in capacitance occurring in the capacitive touch screen. In this case, it may be assumed that the capacitor Cm is a node capacitor in which charges are charged or discharged due to the change in mutual capacitance occurring in an intersecting point of the plurality of electrodes.

The first integration circuit unit 210 may include a first capacitor that is charged or discharged from charges charged in the capacitor Cm. The first capacitor may be connected to the capacitor Cm by an integration circuit including an operation amplifier (OP-AMP) and may be supplied and charged with charges charged in the capacitor Cm. The first integration circuit unit 210 may output a voltage corresponding to the charges charged in the first capacitor.

The voltage output by the first integration circuit unit 210 (hereinafter, referred to as an "output voltage of the first integration circuit unit 210") is input to the comparison circuit unit 220 and the noise removal unit 230. The comparison circuit unit 220 compares an output voltage level of the first integration circuit unit 210 with a reference level and transfers the compared result to the noise removal unit 230. The noise removal unit 230 may remove an effect of noise included in the output voltage of the first integration circuit unit 210 according to the comparison result between the level of the output voltage of the first integration circuit unit 210 and the reference level.

The output voltage of the first integration circuit unit 210 from which the effect of noise has been removed by the comparison circuit unit 220 and the noise removal unit 230 is transferred to the second integration circuit unit 240. The overall configuration of the second integration circuit unit 240 is similar to the first integration circuit unit 210. That is, the second integration circuit unit 240 may include a second capacitor in which charges are charged or discharged by the output voltage of the first integration circuit unit 210 and may generate an output signal determined by an amount of charge charged in the second capacitor.

When the apparatus 200 for sensing capacitance according to the embodiment of the present invention is applied to a capacitive touch screen, the output signal of the second integration circuit unit 240 may be input to an analog-to-digital converter (ADC) and converted into a digital signal. The digital signal converted by the ADC may be employed as sensing data used for an operation unit to determine a touch input.

Figure 3:
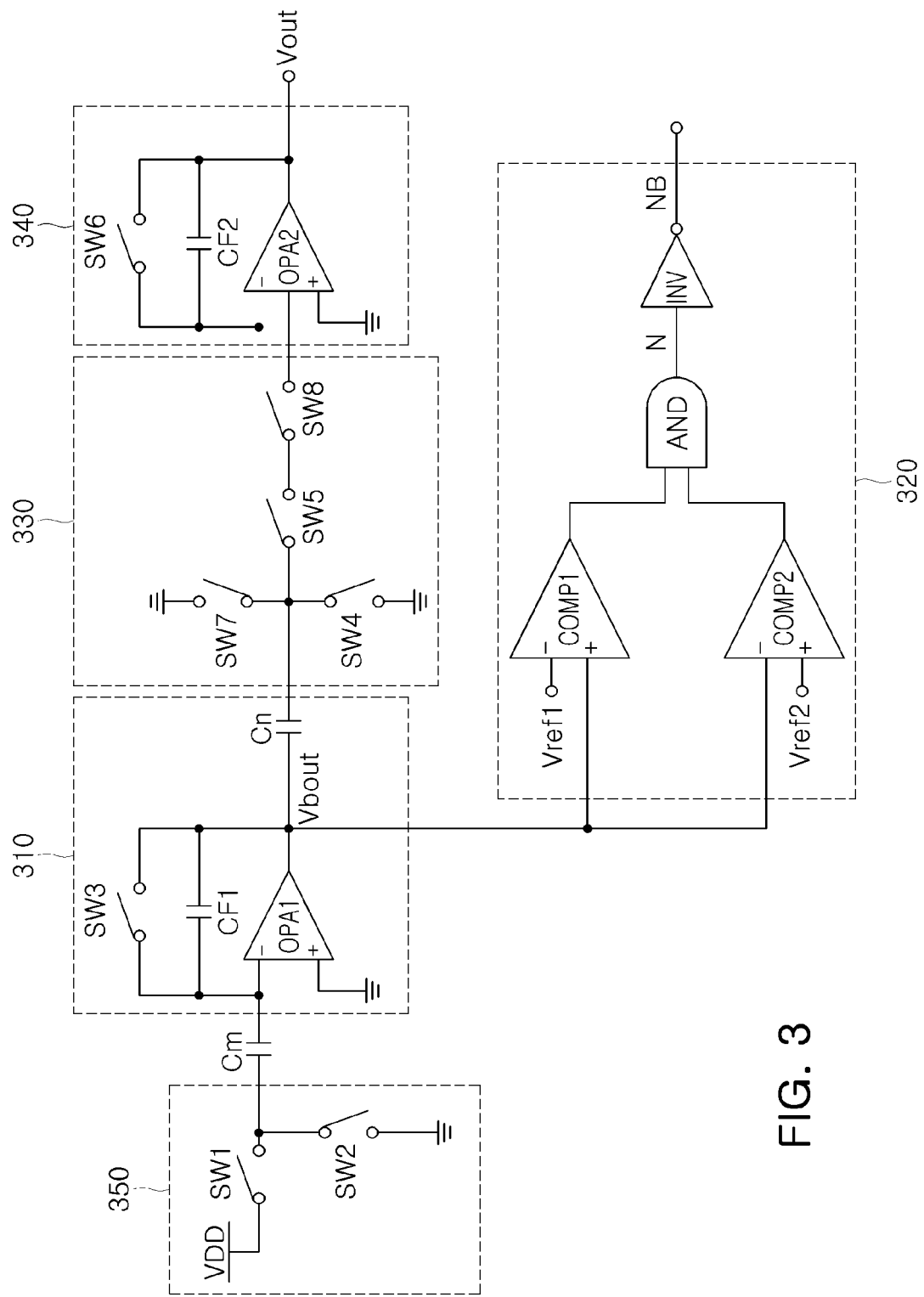
FIG. 3 is a circuit diagram illustrating an apparatus for sensing capacitance according to an embodiment of the present invention.

FIG. 3 is a circuit diagram illustrating an apparatus for sensing capacitance according to an embodiment of the present invention.

Referring to FIG. 3, the apparatus for sensing capacitance according to the embodiment of the present invention may include a first integration circuit unit 310, a comparison circuit unit 320, a noise removal unit 330, a second integration circuit unit 340, a driving circuit unit 350, and the like. Hereinafter, a detailed operation of the apparatus for sensing capacitance according to the embodiment of the present invention will be described with reference to the circuit diagram shown in FIG. 3. Similar to FIG. 2, it is assumed that the capacitor Cm corresponds to a node capacitor of the capacitive touch screen.

First, the driving circuit unit 350 includes two switches SW1 and SW2, wherein the switch SW1 is connected to a node supplying a voltage VDD and a first node of the capacitor Cm. Meanwhile, a switch SW2 is connected to a ground terminal GND and the first node of the capacitor Cm. Therefore, when the switch SW1 is turned-on (closed), charges are charged in the capacitor Cm by the voltage VDD and when the switch SW2 is turned-on, charges charged in the capacitor Cm are discharged. Therefore, the switches SW1 and SW2 may operate with different turn-on times.

Meanwhile, a second node of the capacitor Cm is connected to the first integration circuit unit 310. The first integration circuit unit 310 may include an operation amplifier OPA1, a capacitor CF1, a capacitor Cn, and a switch SW3. The switch SW3 is operated in the same period as the switch SW1. Therefore, charges are charged in the capacitor Cm by the voltage VDD and the operation amplifier OPA1 is reset, while the switches SW1 and SW3 are turned-on and the switch SW2 is turned-off. Meanwhile, charges charged in the capacitor Cm are transferred to the capacitor CF1 while the switches SW1 and SW3 are turned-off and the switch SW2 is turned-on. In this case, an output voltage Vbout of the operation amplifier OPA1 is determined by the following Equation 1.

$$V_{bout} = \frac{VDD * Cm}{CF1}$$ [Equation 1]

As can be appreciated from Equation 1, the output voltage Vbout of the first integration circuit unit 310 may be determined according to a capacity ratio of the capacitor Cm and the capacitor CF1. Therefore, the CFI may be configured as a capacitor having a capacity higher than that of the capacitor Cm including charges to be measured, and as a result, it is possible to prevent the output voltage Vbout of the first integration circuit unit 310 from being saturated.

The output voltage Vbout of the first integration circuit unit 310 may be input to the comparison circuit unit 320 and the noise removal unit 330. As shown in FIG. 3, the comparison circuit unit 320 compares the output voltage Vbout with predetermined reference voltages Vref1 and Vref2. To this end, the comparison circuit unit 320 may include comparators COMP1 and COMP2 and outputs of the comparators are respectively output to the noise removal unit 330 via a predetermined logic circuit. For example, an output signal of the comparison circuit unit 320 may control turning-on and turning-off operations of switches SW7 and SW8 of the noise removal unit 330.

The noise removal unit 330 includes a plurality of switches. The switches SW4, SW5, SW7, and SW8 included in the nose removal unit 330 determine whether to transfer the output voltage Vbout of the first integration circuit unit 310 to the second integration circuit unit 340 as is, according to whether an effect of noise is included in the output voltage Vbout of the first integration circuit unit 310.

In an ideal case, the capacitor Cm defined by electrodes of the capacitive touch screen is charged by the voltage VDD of the driving circuit unit and is changed by a touch input and the amount in which the capacitor Cm is changed may be measured by the capacitor CF1 of the first integration circuit unit 310 and thus, be reflected to the output voltage Vbout. However, when an electrical noise is introduced into the touch screen for any reason, an unwanted change in capacitance due to noise may occur in the capacitor Cm. In the case in which a change in capacitance occurring in the capacitor Cm due to noise is transferred to the output voltage Vbout of the first integration circuit unit 310 as is, this may act as a factor hindering the accurate determination of the touch input.

Therefore, the comparison circuit unit 320 compares a level of the output voltage Vbout of the first integration circuit unit 310 with those of the predetermined reference voltages Vref1 and Vref2, respectively, to determine whether a noise having a positive component or a noise having a negative component is introduced into the touch screen. In general, the output voltage Vbout appearing due to a switching operation between the driving circuit unit 350 and the first integration circuit unit 310 may be smoothly increased or reduced by repeating the charging and discharging of charges. Therefore, when an instantaneous high voltage or low voltage is detected, it may be determined that an electrical noise is introduced to affect the capacitor Cm.

First, when the effect of noise is not reflected to the output voltage Vbout, the output voltage Vbout has a value higher than the reference voltage Vref1 and lower than the reference voltage Vref2 at all times. The reference voltage Vref1, which is a reference voltage for detecting noise having a negative component, has a negative (−) sign and the reference voltage Vref2, which is a reference voltage for detecting noise having a positive (+) component, has a positive (+) sign.

When noise does not occur, the output voltage Vbout is lower than the reference voltage Vref2 and higher than the reference voltage Vref1 and thus, both of the output signals of the comparators COMP1 and COMP2 have a high value. Therefore, an output signal N of an AND gate also has a high value and an output signal NB of an inverter INV has a low value. The output signal N of the AND gate AND is connected to the switch SW8 and the output signal NB of the inverter INV is connected to the switch SW7. Therefore, at the time of a normal operation in which noise does not occur, the switch SW7 is turned-off (opened) and the switch SW8 is turned-on (shorted). Consequently, charges charged in the capacitor Cn are input to the second integration circuit unit 340 and an output voltage Vout of the second integration circuit unit 340 may be determined by the following Equation 2.

$$V_{out} = \frac{V_{bout} * Cn}{CF2} = \frac{VDD * Cm * Cn}{CF1 * CF2} \quad [\text{Equation 2}]$$

On the other hand, when noise having a positive (+) component is introduced, charges charged in the capacitor Cn by the capacitor CF1 of the first integration circuit unit 310 are instantaneously reduced to a value approximating 0V. Therefore, the output voltage Vbout may have a value lower than the reference voltage Vref1 which has a relatively low value and therefore, the comparator COMP1 outputs a low signal. The comparator COMP2 still outputs a high signal and therefore, the output signal N of the AND gate AND is low and the inverter INV outputs the output signal NB having a high value.

Meanwhile, when noise having a negative (−) component is introduced, the output signal Vbout of the first integration circuit unit 310 may be instantaneously increased due to the noise, thereby being saturated. Therefore, since the output signal Vbout has a value higher than the reference voltage Vref2, the output of the comparator COMP1 is still high, while the comparator COMP2 generates an output signal having a low value. As a result, the output signal N of an AND gate AND also has a low value, while the output signal NB of an inverter INV has a high value.

When noise having a positive (+) or negative (−) component is introduced, the output signal N of the AND gate AND has a low value and the output signal NB of the inverter INV has a high value. Therefore, the switch SW7 is turned-on (shorted) and the switch SW8 is turned-off (opened), such that the charges charged in the capacitor Cn are discharged to the ground terminal by the capacitor CF1 of the first integration circuit unit 310. As described above, the output voltage Vout finally generated by the second integration circuit unit 340 may have a more stable value by removing a change in capacitance occurring due to an instantaneous noise. This will be described below with reference to FIGS. 5 to 9.

Figure 4:
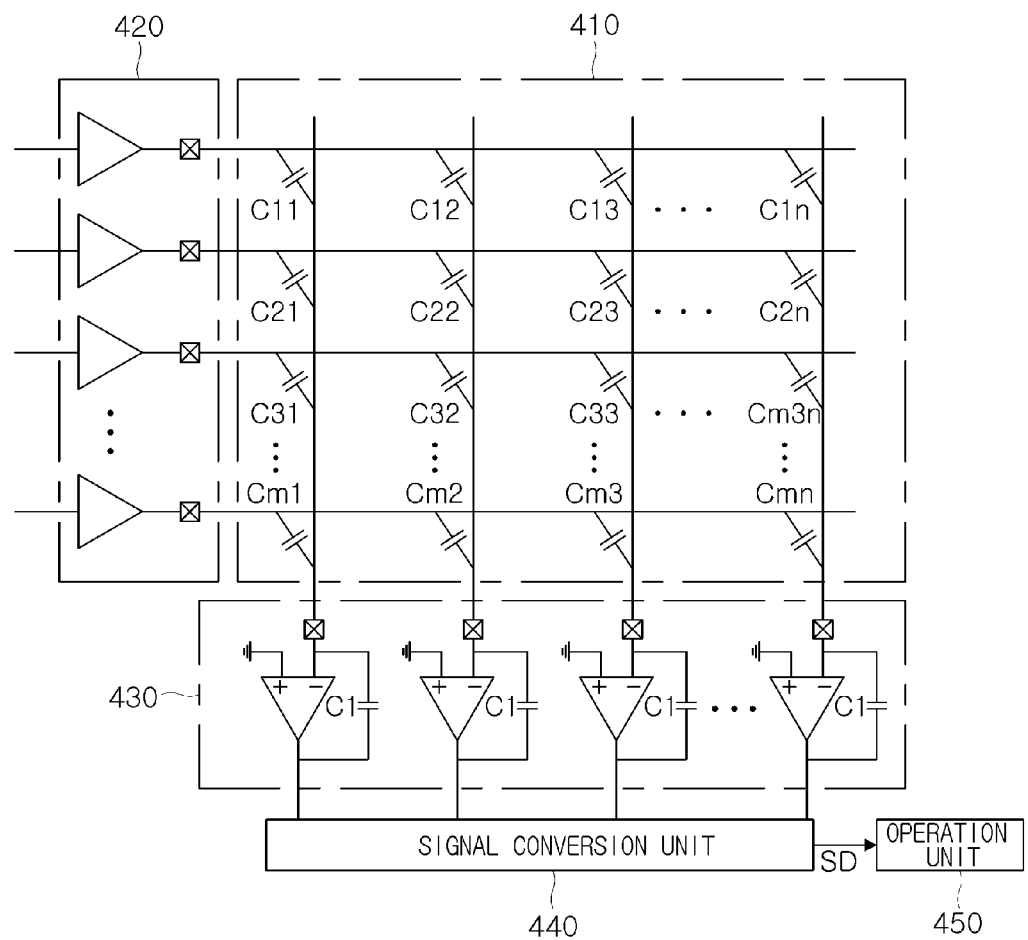
FIG. 4 is a diagram illustrating a touch screen apparatus including an apparatus for sensing capacitance according to an embodiment of the present invention.

FIG. 4 is a diagram illustrating a touch screen apparatus including an apparatus for sensing capacitance according to an embodiment of the present invention.

Referring to FIG. 4, the touch screen apparatus according to the embodiment of the present invention includes a panel unit 410, a driving circuit unit 420, a sensing circuit unit 430, a signal conversion unit 440, and an operation unit 450. The panel unit 410 includes a plurality of first electrodes extending in a first axis direction (a horizontal direction of FIG. 4) and a plurality of second electrodes extending in a second axis direction (a vertical direction of FIG. 4) intersecting with the first axis and has a change in capacitance C11 to Cmn occurring in intersecting points of the first electrodes and the second electrodes. The change in capacitance C11 to Cmn occurring in the intersecting points of the first electrodes and the second electrodes may be the change in mutual-capacitance occurring due to the driving signals applied to the first electrodes by the driving circuit unit 420. Meanwhile, the driving circuit unit 420, the sensing circuit unit 430, the signal conversion unit 440, and the operation unit 450 may be implemented as a single integrated circuit (IC).

The driving circuit unit 420 may apply predetermined driving signals to the first electrodes of the panel unit 410 The driving signals may include a square wave, a sine wave, a triangle wave, and the like, each having a predetermined period and amplitude, and may be sequentially applied to the plurality of first electrodes, respectively. FIG. 4 shows the case in which circuits for generating and applying the driving signals are individually connected to the plurality of first electrodes. However, a configuration in which a single driving signal generation circuit is provided to apply driving signals to the plurality of first electrodes, respectively, using a switching circuit, may also be allowed.

The sensing circuit unit 430 may include an integration circuit for sensing the change in capacitance C11 to Cmn from the second electrodes. The integration circuit may include at least one operation amplifier and a capacitor C1 having a predetermined capacity. An inverting input terminal of the operation amplifier is connected to the second electrodes to convert the change in capacitance C11 to Cmn into an analog signal such as a voltage signal, or the like, thereby outputting the converted signal. When the driving signals are sequentially applied to the plurality of first electrodes, respectively, the change in capacitance may be simultaneously detected from the plurality of second electrodes and therefore, the integration circuit may be provided in an amount corresponding to the number m of second electrodes.

The signal conversion unit 440 generates a digital signal $S_D$ from an analog signal generated by the integration circuit. For example, the signal conversion unit 440 may include a time-to-digital converter (TDC) circuit that measures the time at which the analog signal in a voltage form output from the sensing circuit unit 430 reaches a predetermined reference voltage level and converts the measured time into the digital signal $S_D$ or an analog-to-digital converter (ADC) circuit that measures the amount in which the level of the analog signal output from the sensing circuit unit 430 has changed for a predetermined time and converts the measured amount into the digital signal $S_D$. The operation unit 450 uses the digital signal $S_D$ to determine a touch input applied to the panel unit 410. As the embodiment of the present invention, the operation unit 450 may determine the number, coordinates, gesture operations, and the like, of the touch input applied to the panel unit 410.

When comparing the apparatuses for sensing capacitance shown in FIGS. 2 and 3 with the touch screen apparatus of FIG. 4, the node capacitors C11 to Cmn generated at the intersecting points between the first electrodes and the second electrodes correspond to the capacitor Cm of FIGS. 2 and 3. In addition, the driving circuit unit 420 of FIG. 4 may be considered to correspond to components including the driving circuit units 250 and 350 shown FIGS. 2 and 3 and the sensing circuit unit 430 of FIG. 4 may be considered to correspond to components including the first integration circuit units 210 and 310, the comparison circuit units 220 and 320, the noise removal units 230 and 330, and the second integration circuit units 240 and 340 shown FIGS. 2 and 3.

FIGS. 5 to 9 are diagrams for describing a method for sensing touch according to an embodiment of the present invention.

Figure 5:
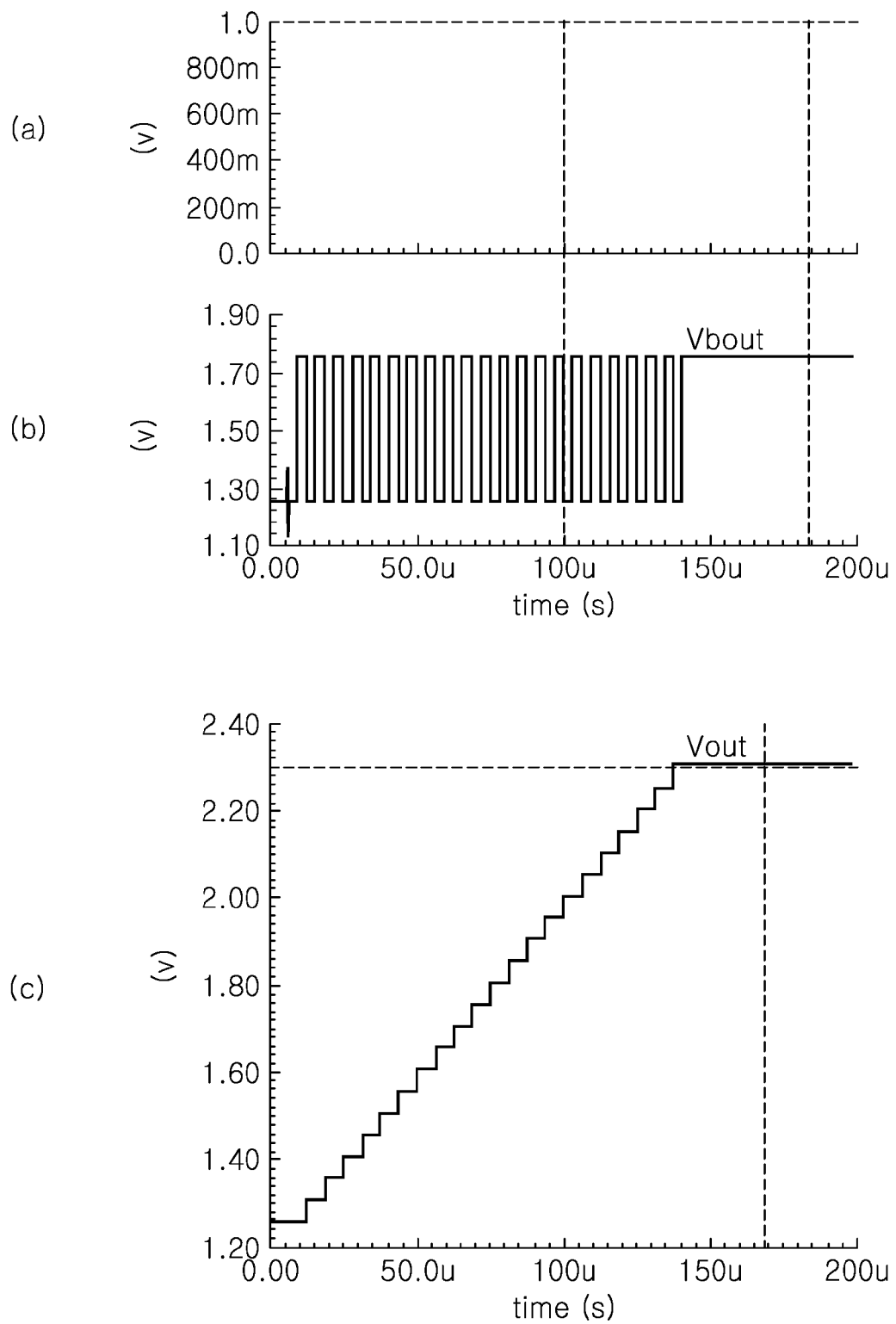
FIGS. 5 to 9 are diagrams for describing a method for sensing a touch according to an embodiment of the present invention.

First, FIG. 5 shows the output voltage Vbout of the first integration circuit unit 310 and the output voltage Vout of the second integration circuit unit 340 when noise is not introduced. As shown in FIG. 5A, noise does not appear. Therefore, the output voltage Vbout of the first integration circuit unit 310 shows a stable waveform as shown in FIG. 5B. Referring to FIG. 5C, the output voltage Vout of the second integration circuit unit 340 is sequentially increased and thus, reaches a level of 2.3V at a time of about 170 μs.

Figure 6:
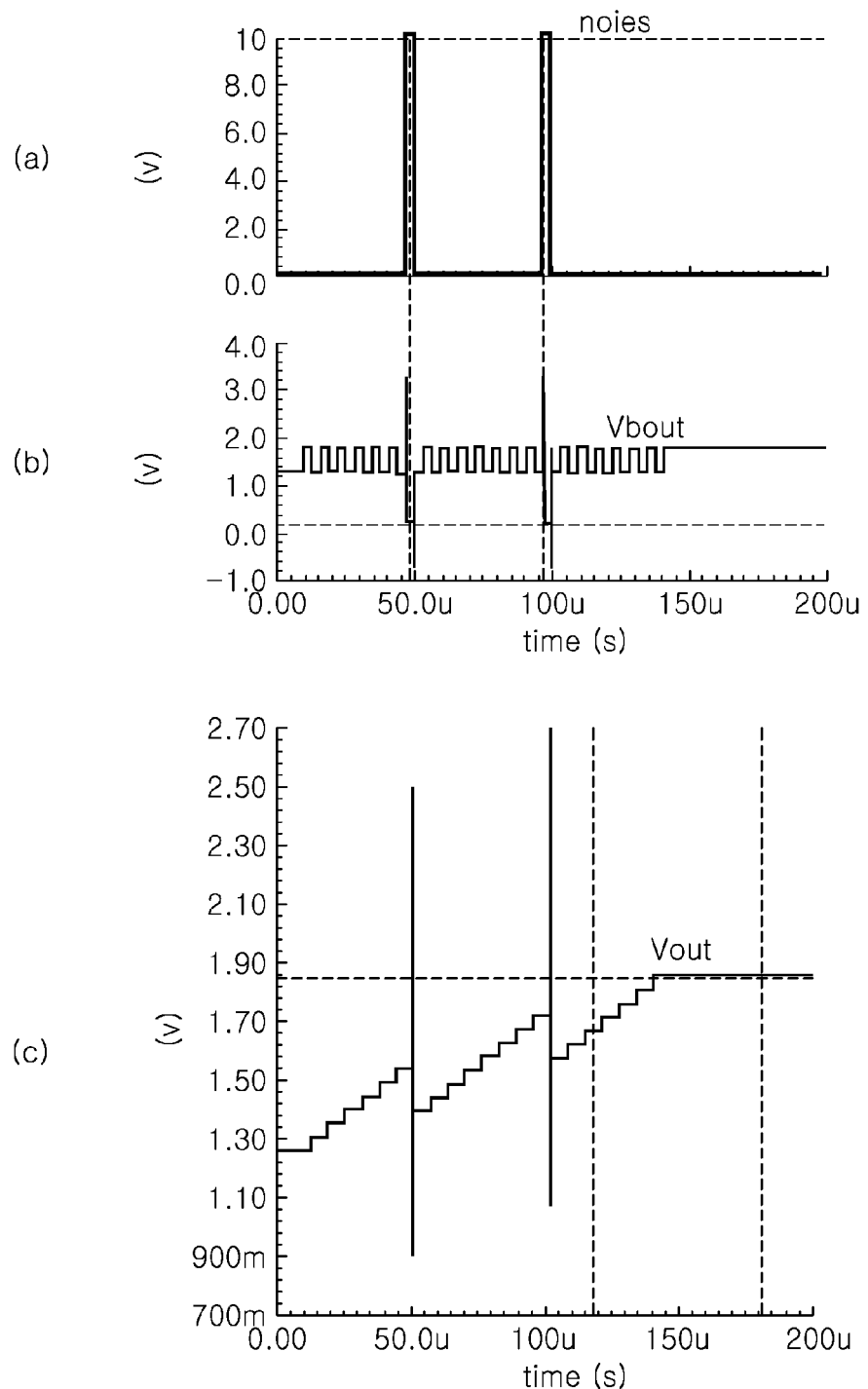

FIG. 6 shows a simulation result regarding a case in which noise having a positive (+) component is generally introduced into a general apparatus for sensing capacitance, to affect the capacitor Cm. Referring to FIG. 6A, noise having a positive (+) component is introduced at the times of 50 μs and 100 μs, respectively. In addition, as shown in FIG. 6B, the output voltage Vbout of the first integration circuit unit 310 is instantaneously reduced to about 0V at the times of 50 μs and 100 μs due to noise. The output voltage Vout of the second integration circuit unit 340 is in proportion to the output voltage Vbout of the first integration circuit unit 310 and the output voltage Vout of the second integration circuit unit 340 is instantaneously reduced at the times of 50 μs and 100 μs accordingly. Therefore, as shown in FIG. 6C, the output voltage Vout of the second integration circuit unit 340 is saturated at 1.89V and shows a difference from 2.3V, a normal output level, when noise does not occur.

Figure 7:
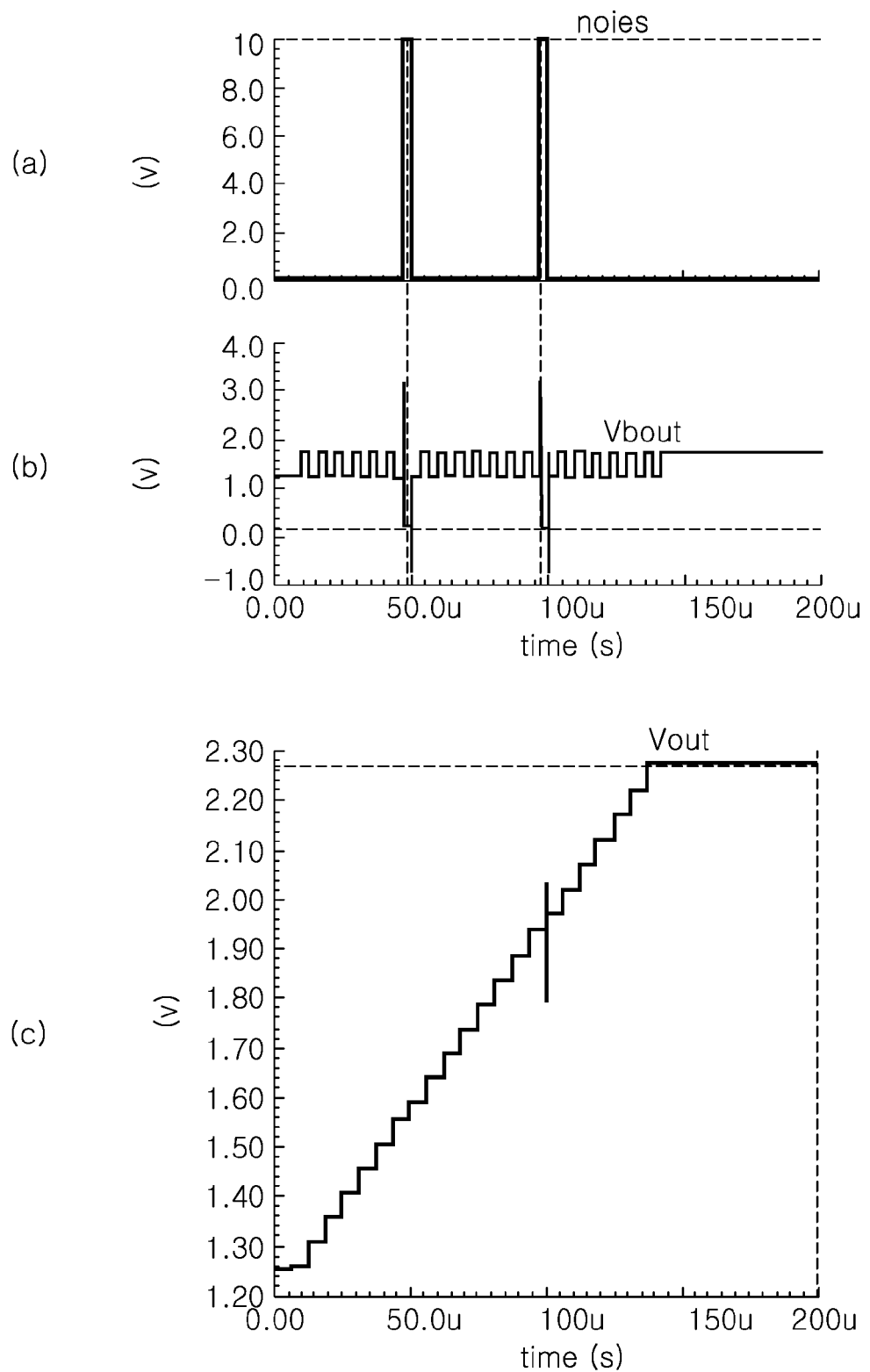

FIG. 7 shows a simulation result regarding a case in which noise having a positive (+) component is introduced into the apparatus for sensing capacitance according to the embodiment of the present invention as shown in FIGS. 2 and 3. FIGS. 7A and 7B show that noise having a positive (+) component is introduced at the times of 50 μs and 100 μs as shown in FIGS. 6A and 6B. The output voltage Vbout of the first integration circuit unit 310 shows a waveform that is instantaneously reduced to 0V, similar to the case of FIG. 6B.

As described above, when noise having a positive (+) component is introduced and the output voltage Vbout of the first integration circuit unit 310 is reduced to 0V, the comparison circuit unit 320 determines that Vbout is lower than the reference voltage Vref1. Therefore, the output of the comparator COMP1 has a low value and the output of the comparator COMP2 has a high value, and thus, the output signal N of the AND gate AND and the output signal NB of the inverter INV may have a low value and a high value, respectively. As a result, the switch SW7 of the noise removal unit 330 is turned-on (shorted) and the switch SW8 is turned-off (opened) and the change in capacitance of the capacitor Cn due to the noise may not be transferred to the second integration circuit unit 340.

Referring to FIG. 7C, the output voltage Vout of the second integration circuit unit 340 may be slightly reduced at the times of 50 μs and 100 μs. However, a voltage value at which Vout is finally saturated is 2.27V, a value having little difference from 2.3V, confirmed in a simulation result of FIG. 5 made under the assumption that noise is not introduced. Therefore, it can be confirmed that the affect of noise is almost removed from the apparatus for sensing capacitance according to the embodiment of the present invention.

Figure 8:
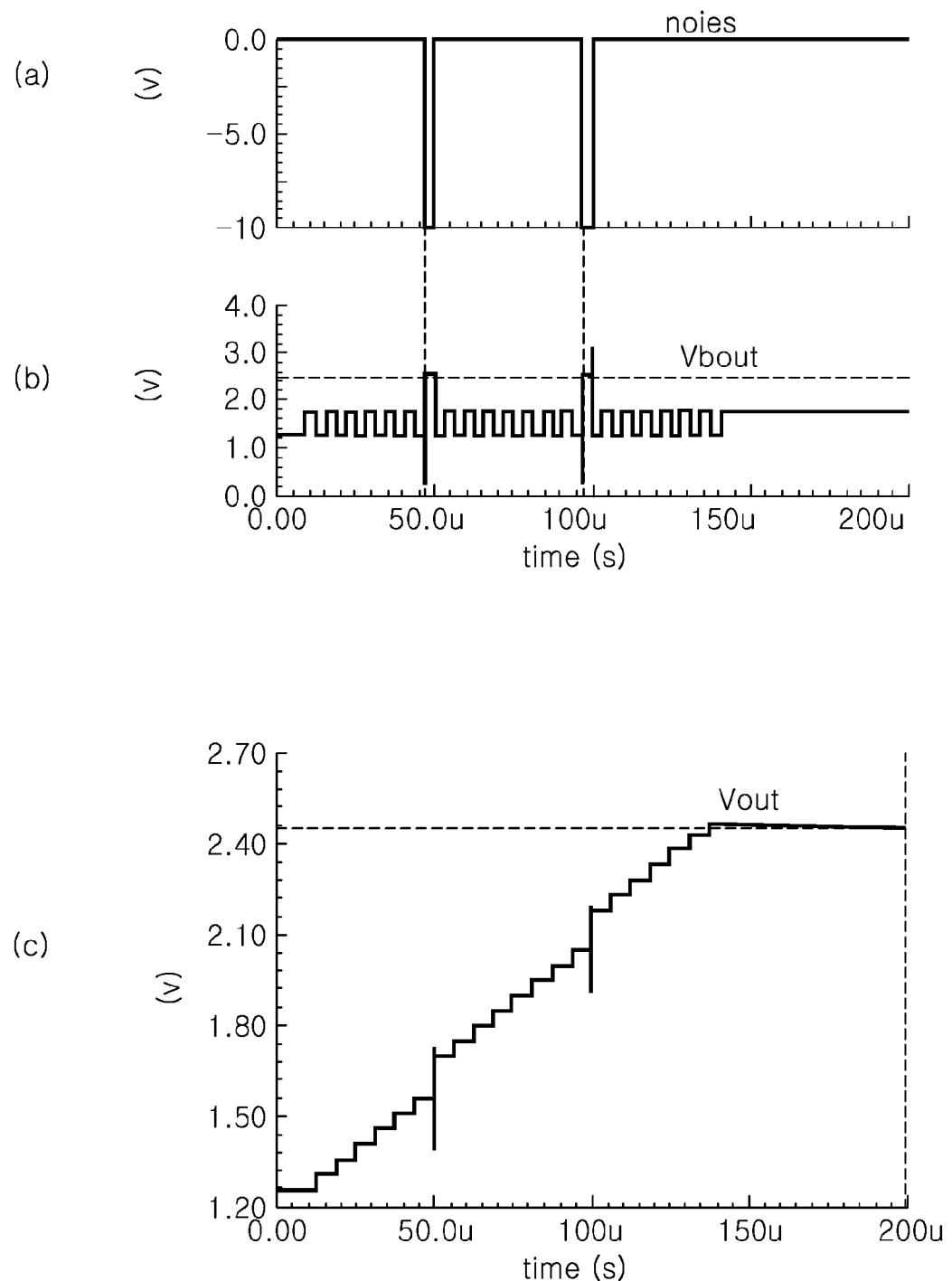

FIG. 8 is a simulation result made under the assumption that noise having a negative (−) component is introduced into a general apparatus for sensing capacitance. As shown in FIG. 8A, noise having a negative (−) component is introduced at the times of 50 μs and 100 μs. Referring to FIG. 8B, the output voltage Vbout of the first integration circuit unit 310 is instantaneously increased when the noise is introduced and is thus saturated at a value of about 2.5V. As shown in FIG. 8C, it can be confirmed that the output voltage Vout of the second integration circuit unit 340 is instantaneously increased at the times of 50 μs and 100 μs. As a result, the output voltage Vout of the second integration circuit unit 340 is saturated at a value of 2.45V.

Figure 9:
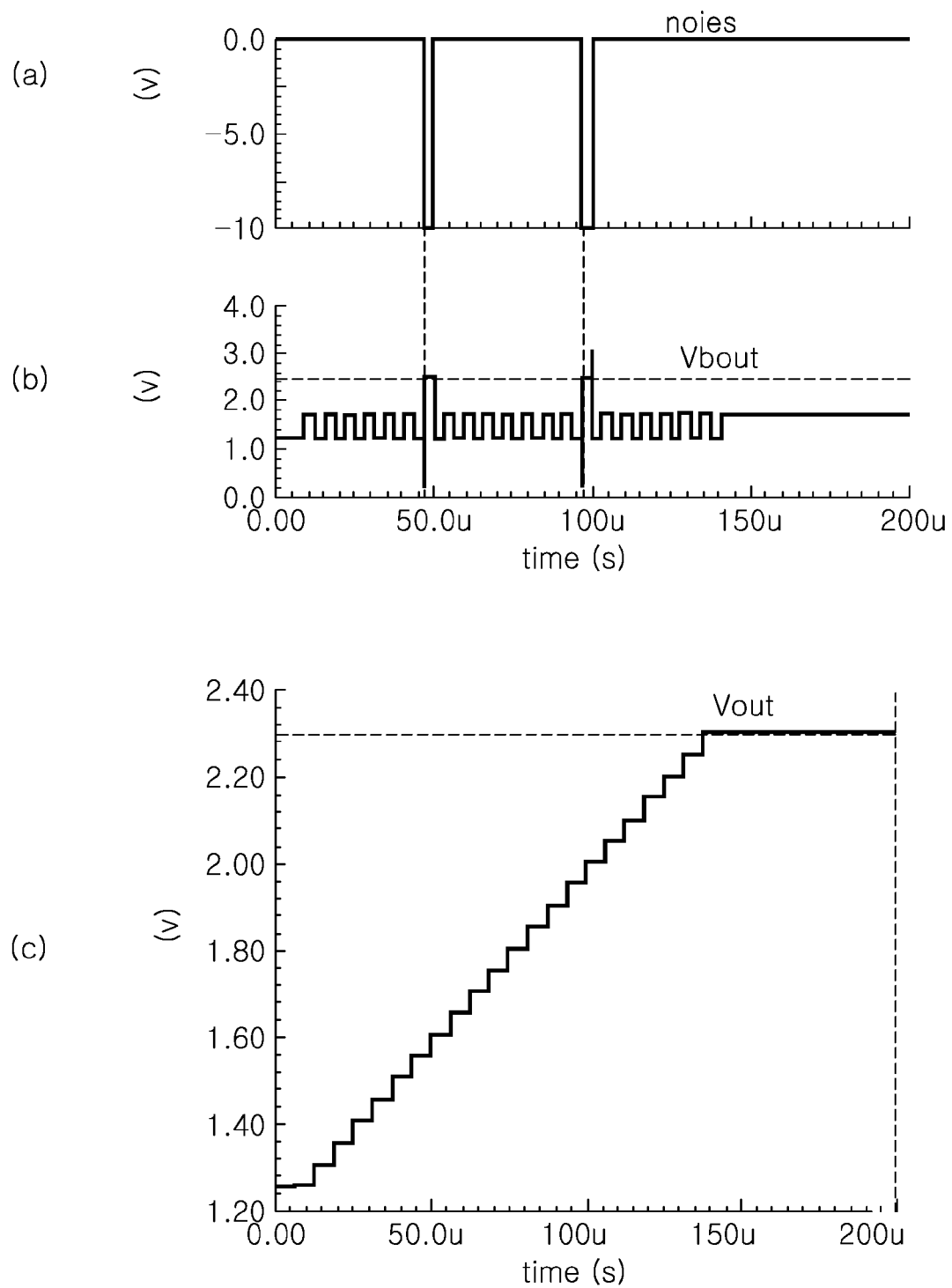

FIG. 9 is a simulation result made under the assumption that noise having a negative (−) component is introduced into the apparatus for sensing capacitance according to the embodiment of the present invention. Referring to FIGS. 9A and 9B, the noise having a negative (−) component is introduced at the times of 50 μs and 100 μs, respectively, such that the output voltage Vbout of the first integration circuit unit 310 is instantaneously increased, in a similar manner to the case of FIGS. 8A and 8B. When the output voltage Vbout of the first integration circuit unit 310 is instantaneously increased and thus, is higher than the reference level Vref2, the output of the comparator COMP1 of the comparison circuit unit 320 has a high value and the output of the comparator COMP2 thereof has a low value. As a result, the output signal N of the AND gate AND has a low value and the output signal NB of the inverter INV has a high value and therefore, the switch SW7 is turned-on (shorted) and the switch SW8 is turned-off (opened).

Therefore, the charges instantaneously charged in the capacitor Cn at the times of 50 μs and 100 μs at which noise is introduced are discharged to the ground terminal through the switch SW7 and are not transferred to the second integration circuit unit 340 due to the opening of the switch SW8, thereby reducing an output error due to the noise. Referring to FIG. 9C, the output voltage Vbout of the second integration circuit unit 340 is saturated at a value of about 2.27V, which is approximately the same value as the value obtained from the simulation result when the noise shown in FIG. 5c is not introduced.

As set forth above, according to embodiments of the present invention, the first capacitor is first charged from the change in capacitance to be measured to determine whether a change in a voltage level of the first capacitor occurs due to an electrical noise. When the voltage level of the first capacitor fluctuates due to noise and is higher than the predetermined reference level, the effect of noise may be minimized and the change in capacitance to be measured may be accurately detected by discharging the charges charged by noise through operating a switching device connected to the first capacitor.

While the present invention has been shown and described in connection with the embodiments, it will be apparent to those skilled in the art that modifications and variations can be made without departing from the spirit and scope of the invention as defined by the appended claims.

What is claimed is:

1. An apparatus for sensing capacitance, the apparatus comprising:
a first integration circuit unit, including a first capacitor configured to be charged by a change in capacitance occurring in a sensing electrode;
a comparison circuit unit, configured to compare a level of an output signal of the first integration circuit unit with a predetermined reference level; and
a noise removal unit, including a plurality of switches configured to operate according to an output of the comparison circuit unit,
wherein the comparison circuit unit is configured to control an operation of each of the plurality of switches to discharge charges charged in the first capacitor, when the level of the output signal of the first integration circuit unit is higher than the reference level.

2. The apparatus of claim 1, further comprising:
a second integration circuit unit connected to the noise removal unit, and including a second capacitor configured to be charged by the charges charged in the first capacitor; and
an operation unit configured to determine a touch input from an output signal of the second integration circuit unit.

3. The apparatus of claim 2, wherein the noise removal unit includes a first switch connected to a ground terminal, and a second switch connected to an input node of the second integration circuit unit.

4. The apparatus of claim 3, wherein the comparison circuit unit is configured to turn-off the second switch and to turn-on the first switch, when the level of the output signal of the first integration circuit unit is higher than the reference level.

5. The apparatus of claim 1, wherein the comparison circuit unit includes a first comparison circuit configured to compare the level of the output signal of the first integration circuit unit with a first reference level, and a second comparison circuit configured to compare the level of the output signal of the first integration circuit unit with a second reference level.

6. The apparatus of claim 5, wherein the comparison circuit unit is configured to operate each of the plurality of switches to discharge the charges charged in the first capacitor, when the level of the output signal of the first integration circuit unit is higher than the first reference level, or lower than the second reference level.

7. A method for sensing a change in capacitance occurring in a plurality of node capacitors defined in respective intersecting points between a plurality of first electrodes and a plurality of second electrodes, the method comprising:
charging charges in at least one of the node capacitors;
comparing a voltage level of a first capacitor supplied with the charges charged in the at least one node capacitor with a predetermined reference level; and
operating a plurality of switches to discharge the charges supplied to the first capacitor, when the voltage level of the first capacitor is instantaneously increased to be higher than the reference level due to noise.

8. The method of claim 7, wherein in the comparing of levels, a first reference level, and a second reference level having a value lower than the first reference level, are respectively compared with the voltage level of the first capacitor.

9. The method of claim 8, wherein in the operating of a plurality of switches, the plurality of switches are operated to discharge the charges supplied to the first capacitor, when the voltage level of the first capacitor is higher than the first reference level, or lower than the second reference level.

10. The method of claim 7, wherein in the operating of a plurality of switches, a first switch connected between the first capacitor and a ground terminal is turned-on, and a second switch connected between the first capacitor and an integration circuit is turned-off, when the voltage level of the first capacitor is higher than the reference level.

11. The method of claim 7, further comprising:
charging a second capacitor with the charges supplied to the first capacitor; and
determining a touch input causing a change in capacitance, based on an voltage of the second capacitor.

12. A touch screen apparatus, comprising:
a panel unit, including a plurality of driving electrodes and a plurality of sensing electrodes;
a driving circuit unit configured to apply driving signals to the plurality of driving electrodes, respectively;
a sensing circuit unit configured to sense a change in capacitance occurring in intersecting points between the driving electrodes having the driving signals applied thereto and the plurality of sensing electrodes; and
a control unit configured to control an operation of the driving circuit unit and the sensing circuit unit,
wherein the sensing circuit unit includes a buffer circuit, a switching circuit, and an integration circuit unit, and
wherein the buffer circuit includes a first capacitor configured to be charged by the change in capacitance, and
wherein the control unit is configured to operate the switching circuit to partially discharge charges charged in the first capacitor, when a voltage level of the first capacitor is instantaneously increased to be higher than a predetermined reference level due to noise.

13. The touch screen apparatus of claim 12, wherein the integration circuit unit is configured to generate an output signal transferred to the control unit, based on the charges charged in the first capacitor.

14. The touch screen apparatus of claim 13, wherein the control unit is configured to determine a touch input applied to the panel unit from the output signal of the integration circuit unit.

15. The touch screen apparatus of claim 12, wherein the switching circuit includes a first switch connected between the first capacitor and a ground terminal, and a second switch connected between the first capacitor and an input terminal of the integration circuit unit.

16. The touch screen apparatus of claim 15, wherein the control unit is configured to turn-on the first switch and to turn-off the second switch, when the voltage level of the first capacitor is higher than the predetermined reference level.

* * * * *